(12) United States Patent  
Madson

(10) Patent No.: US 9,030,039 B2
(45) Date of Patent: May 12, 2015

(54) WIND TURBINE AND COMPRESSED GAS STORAGE SYSTEM FOR GENERATING ELECTRICAL POWER

(71) Applicant: Charles Martin Chavez Madson, Iloilo (PH)

(72) Inventor: Charles Martin Chavez Madson, Iloilo (PH)

(*) Notice: Subject to any disclaimer, the term of this patent is extended or adjusted under 35 U.S.C. 154(b) by 0 days.

(21) Appl. No.: 14/292,862

(22) Filed: May 31, 2014

(65) Prior Publication Data

US 2014/0353978 A1   Dec. 4, 2014

Related U.S. Application Data

(60) Provisional application No. 61/830,134, filed on Jun. 2, 2013, provisional application No. 61/993,956, filed on May 15, 2014.

(51) Int. Cl.
 *F03D 9/02* (2006.01)
 *F03D 9/00* (2006.01)

(52) U.S. Cl.
 CPC ............... *F03D 9/028* (2013.01); *F03D 9/002* (2013.01)

(58) Field of Classification Search
 CPC ........................................................ Y02E 60/15
 USPC ...................................................... 290/44, 55
 See application file for complete search history.

(56) References Cited

U.S. PATENT DOCUMENTS

| 2,454,058 | A | | 11/1948 | Hayes | |
|---|---|---|---|---|---|
| 3,806,733 | A | * | 4/1974 | Haanen | 290/55 |
| 4,423,333 | A | * | 12/1983 | Rossman | 290/44 |
| 2007/0102938 | A1 | | 5/2007 | Poole | |
| 2010/0060013 | A1 | | 3/2010 | Csefko | |
| 2010/0107621 | A1 | | 5/2010 | Garvey | |
| 2011/0061836 | A1 | | 3/2011 | Ingersoll et al. | |
| 2011/0169275 | A1 | | 7/2011 | Garvey | |
| 2012/0104763 | A1 | * | 5/2012 | Lind | 290/55 |
| 2013/0305704 | A1 | * | 11/2013 | Ingersoll et al. | 60/521 |

* cited by examiner

*Primary Examiner* — Tulsidas C Patel
*Assistant Examiner* — Sean Gugger
(74) *Attorney, Agent, or Firm* — R. Michael West

(57) ABSTRACT

A wind turbine and compressed gas storage system for producing electrical energy. A plurality of wind turbines is serially interconnected for staged compression to output high pressure compressed gas. Each wind turbine includes an upper head portion with two or more propellers, a gear box, a rudder and fin assembly, and a propeller feathering and braking system, all pivotally mounted on a lower storage tank portion. The storage tank portion houses a turbine compressor, and one or more internal tanks. Compressed gas, outputted from one or more of such lines, is directed into a reserve tank, comprising a plurality of concentric, scalloped, ring-like tanks, interconnected by pressure-actuated valves. Each tank is adapted for storing compressed gas at stepped pressures, varying from the highest pressure central tank to the lowest pressure outermost ring tank. Compressed gas from the outer ring tank drives one or more air turbines and respective electrical generators.

19 Claims, 11 Drawing Sheets

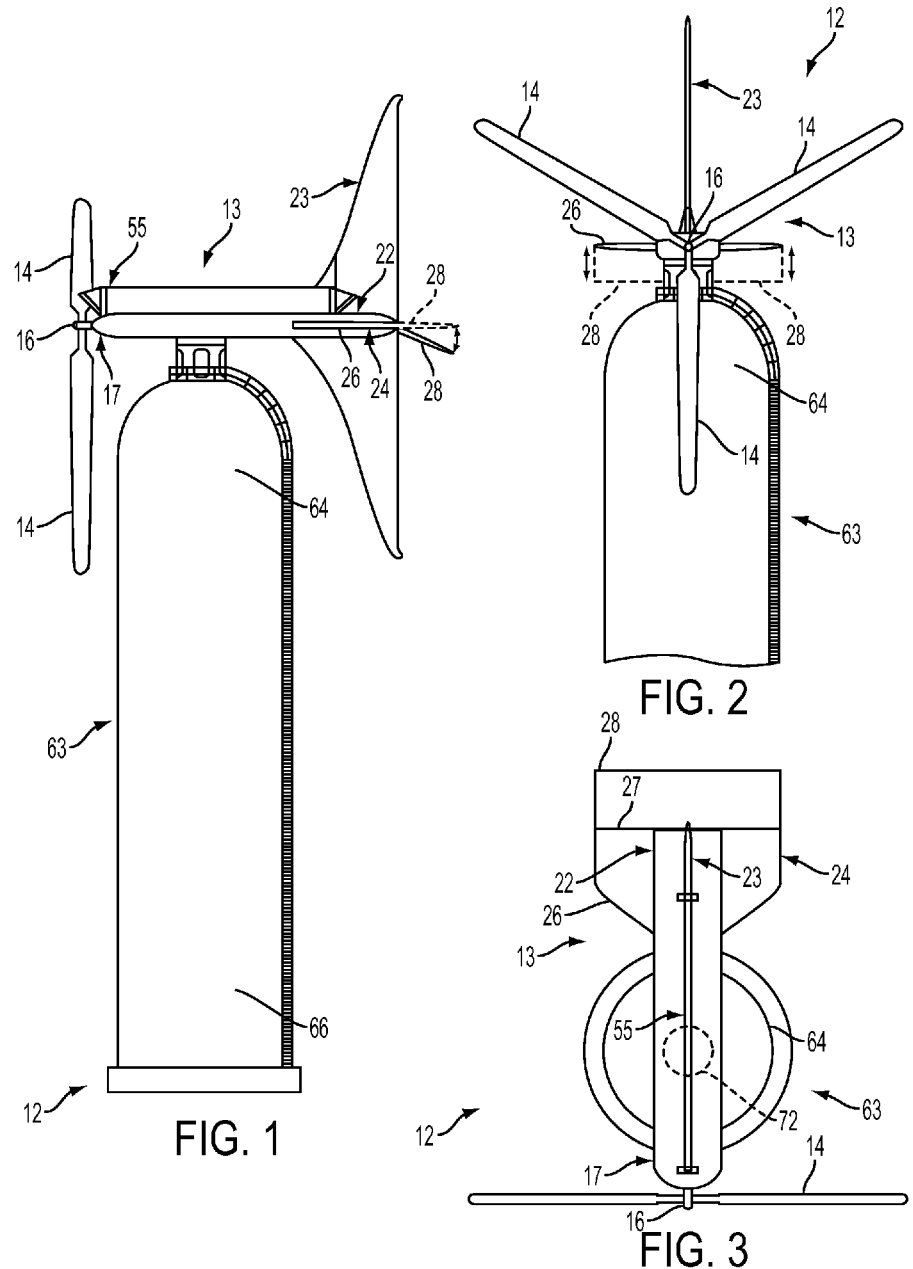

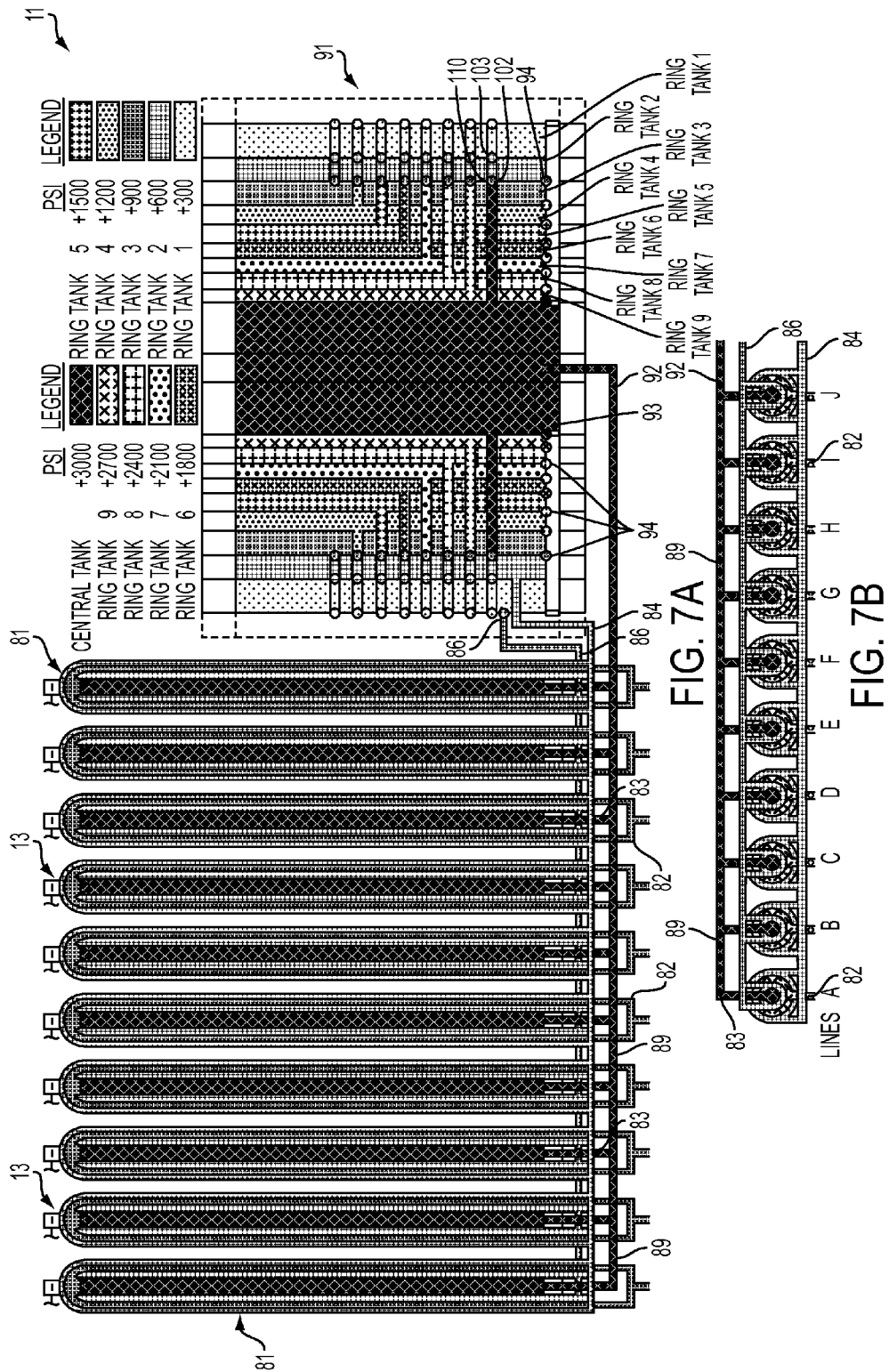

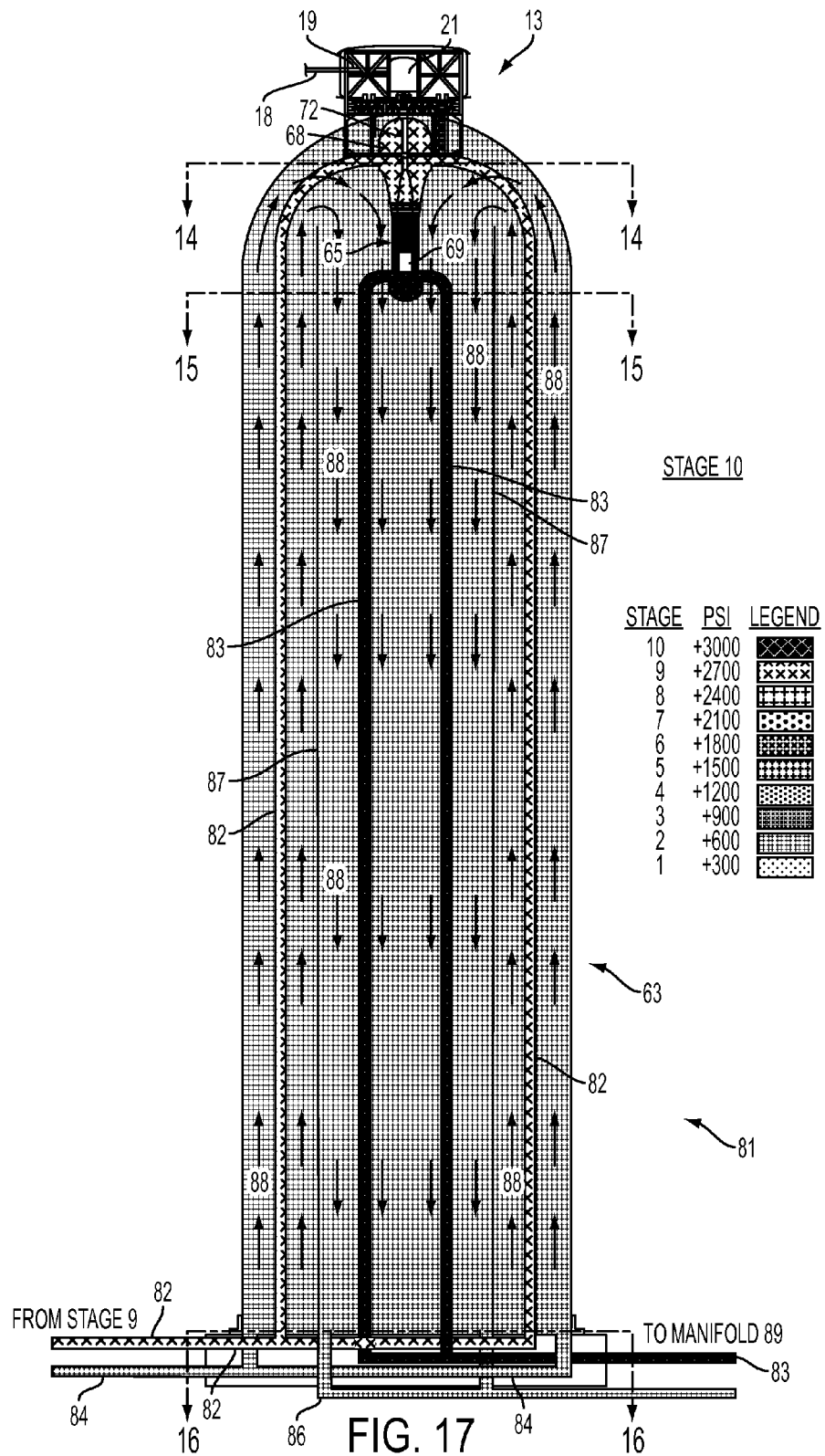

WIND TURBINE AND COMPRESSED GAS STORAGE SYSTEM FOR GENERATING ELECTRICAL POWER

PRIORITY CLAIM

Pursuant to the provisions of 35 U.S.C. §119(e)(1), Applicant claims the priority of: U.S. Provisional Patent Application Ser. No. 61/830,134, filed Jun. 2, 2013; and, U.S. Provisional Patent Application Ser. No. 61/993,956, filed May 15, 2014.

BACKGROUND OF THE INVENTION

1. Field of the Invention

The invention relates generally to improvements in generating electrical power from wind. More particularly, the invention comprises a plurality of wind turbines serially interconnected for staged compression to output very high pressure compressed gas into a reserve tank including a plurality of concentric ring-like tanks having scalloped sidewalls, each ring tank being adapted for storing compressed gas at progressively lower pressures, from the central tank to the outer ring tank, from which gas is routed to drive one or more air turbines and respective electrical generators.

2. Description Of The Prior Art

One of the most vexing problems associated with the direct conversion of wind energy to electrical power is storage of the converted energy. Even in areas which are selected for wind power generation owing to their relatively high average wind speed, wind by its nature is capricious and unreliable. The wind may not be strongest at the time of day or night when energy demand is greatest. Or, the wind may simply cease for protracted periods, during which electrical power is still needed. Efforts have been made on a smaller scale, to utilize electrical storage means such as batteries, but batteries are not feasible to store electrical energy on a commercial scale.

It has also been suggested to convert the electrical power into another form of energy that may be stored and later reconverted back into electrical power. This latter approach may use the wind generated electrical power to pump water into an elevated water storage tank or reservoir, from which the water is later drawn to power a hydroelectric plant to produce electricity. Because it requires two conversions of energy, each of which has its own complications and inefficiencies, as well as a ready source of water and a water storage facility, this approach has some drawbacks.

Yet another system design for the storage of energy produced by wind power involves the indirect production of electricity, from kinetic energy in the form of compressed gas. An air or a gas turbine compressor, driven by a wind turbine, directly produces compressed air or gas which can be stored in a tank for later utilization. Such a system does not rely upon the availability of water and a water storage facility, and two conversions of energy are not required.

For example, U.S. Patent Application Publication No. US 2010/0060013, filed by Csefkó, discloses Procedure And Equipment For Water/Wind Generators' Performance Improvement With The Addition Of A Pneumatic System. In this arrangement, compressed air is stored both in a container within the supporting column for an electrical generator driven by the wind, and in a separate container some distance from the generator. A pneumatic compressor, which shares a power shaft with the electrical generator, provides compressed air to the storage containers.

In U.S. Patent Application Publication No. US 2011/0061836, owned by Ingersoll et al., a Compressor And/Or Expander Device is shown. This publication shows a wind turbine in combination with multiple-stage compressors driven by the electrical output of the wind turbine and an intervening motor and a hydraulic actuator. This reference also shows storage of the output of a $3^{rd}$ Stage compressor in a storage structure. See, e.g., FIG. 8, and ¶[0093]-¶[0094].

In U.S. Patent Application Publication No. US 2010/0107621, filed by Garvey, a device adapted for Power Conversion is disclosed. This apparatus uses a compressor feeding a plurality of expanders, mechanically coupled to a generator. Heat exchangers are used to cool the compressed air, before it is delivered to the expanders. A storage "arrangement" 214, is used to store compressed air.

Early U.S. Pat. No. 2,454,058, granted to Hays, teaches An Apparatus For Converting Intermittent Power To Continuous Power. This arrangement relies upon underground storage of the compressed air, to store energy to drive the electrical generator when the wind turbine is unable to do so.

"Power Generation" is shown in U.S. Patent Application No. US 2011/0169275, owned by Garvey. In this apparatus, each wind generator includes a compressor for producing compressed air. The output of each compressor is fed to an expander and a generator. An underwater "storage arrangement" is also provided to store excess compressed air.

In U.S. Patent Application Publication No. US 2007/0102938, owned by Poole, an Infuser Augmented Vertical Wind Turbine Electrical Generating System is illustrated. This construction also relies upon a plurality of motors, pumps, and tanks adapted to provide pneumatic force to drive the turbine during quiet wind conditions. See, FIG. 9.

In contrast to the above-discussed prior art, it is an object herein to provide a wind turbine which includes a large compressed gas storage tank as part of its support structure.

Furthermore, it is an object of the present invention to provide a wind turbine which has a simple, yet effective, mechanical mechanism for feathering and braking the propellers or sails of the turbine to reduce the chances of damage during high wind conditions.

It is also an object herein to teach an array of wind turbines, comprising a plurality of groups or lines of wind turbines, each group or line comprising a plurality of wind turbines serially interconnected and adapted for staged compression to provide a very high pressure compressed gas output, the output of each of the groups being connected to a common manifold for storage.

It is also an object herein to disclose a cooling system within the storage tanks of certain of the wind turbines which are storing compressed gas under elevated temperatures, for the purpose of reducing and controlling the temperature of the contained gas and improving the performance of gas or turbine air compressors driven by the wind turbines.

It is also an object herein to illustrate a reserve tank to receive the very high pressure compressed gas outputs of the groups or lines of turbine air compressors from a common manifold, in which the reserve tank includes a plurality of concentric and scalloped, ring-like tanks, each ring tank being adapted for storing compressed gas at a predetermined pressure, from the highest pressure central tank to the lowest pressure outermost ring tank, from which gas is routed to drive one or more air turbines and respective electrical generators.

These and other objects will become apparent in the specification and the detailed description of the preferred embodiment, to follow.

SUMMARY OF THE INVENTION

A wind turbine includes a head portion having at least two propellers extending radially from a hub, the hub being mounted for rotation on a front end of the head portion. The wind turbine further includes a drive shaft interconnecting the hub with an input shaft of a gear box. A rudder and a fin assembly are provided on the rear end of the head portion. The rudder comprises a vertical member for directing the wind turbine into the prevailing winds. The fin assembly has a fixed horizontal portion with a trailing edge, and elevator pivotally attached to the trailing edge. The elevator has a normal downward inclination when the incoming winds are weak or absent, and a near horizontal orientation when the incoming winds are very strong.

The wind turbine also includes a turbine air compressor, provided with an upper air inlet and a lower air outlet. The lower air outlet is provided with a check valve to prevent compressed air from re-entering the turbine air compressor during quiescent periods. An output shaft extends vertically and downwardly from the gear box in the head portion of the wind turbine, to drive the turbine air compressor.

The wind turbine further includes a storage tank portion, having an upper end and a lower end. The head portion of the wind turbine is pivotally attached to the upper end of the storage tank portion so that it may freely rotate into and face the incoming winds. In one embodiment, the storage tank portion has an inner volume for the storage of compressed air. The turbine air compressor is mounted within the upper end of the storage tank portion with its upper air inlet being in communication with ambient air outside the tank portion, and its lower air outlet being in communication with the inner volume of the storage tank portion.

The propellers of the wind turbine may also be mounted to the hub for rotation about their respective longitudinal axes. So equipped, the propellers may be rotated between a first rotational position, where the propellers are fully engaged with incoming wind, and a second rotational position where the propellers are "feathered", or minimally engaged with incoming wind.

For the purpose of effecting such movement of the propellers, a propeller feathering and braking system is provided. As disclosed, the propeller feathering and braking system is purely mechanical, keeping the structure simple and the operation reliable, without human or electronic intervention. The feathering and braking system comprises means interconnecting the elevator of the fin assembly with a circular gear on each of the propellers, adjacent the hub. When the elevator is in a downwardly directed orientation, the propellers are in the first position fully engaged with the wind. When the elevator is in a substantially horizontal position owing the presence of a strong wind, the propellers are rotated about their axes into the second position, minimally engaged with the wind. When the wind is extreme, the associated braking system which is directly connected to the wind turbine drive shaft, is automatically actuated.

In a second embodiment of the wind turbine, the tank portion is modified. In this second embodiment, the inner volume includes an inner tank which defines a first volume outside the inner tank and a second volume within the inner tank. In addition, this second embodiment locates the turbine air compressor completely within the first volume having its air inlet in communication with the first volume. And, the air outlet of the turbine air compressor is in communication with the second volume, creating a pressure differential between the first and second volumes.

This second type of wind turbine is the building block for a plurality of wind turbines which are serially interconnected for staged compression. In staged compression, the output from the second volume of one wind turbine is delivered to the first volume of the next wind turbine. As a consequence, air pressures are successively increased, in 300 psi increments, from approximately 300 psi outputted by the first (stage 1) wind turbine, to approximately 1500 psi outputted by a fifth (stage 5) wind turbine.

With increasing air pressures comes the need for a cooling mechanism for the tank portion of successive wind turbines past the stage 5 wind turbine. In a third embodiment of the wind turbine, the inlet to the turbine air compressor is in communication with a low pressure air supply line extending from the second volume or the air supply line of a preceding wind turbine. The air outlet from the turbine air compressor is in communication with a high pressure air supply line extending outside the inner volume of the tank portion of the third embodiment wind turbine.

As with the other embodiments of the wind turbine, each third embodiment wind turbine provides staged compression, increasing the pressure of the air incoming from the preceding wind turbine by approximately 300 psi. For the purpose of cooling the compressed air, the turbine air compressor, and the supply lines in this embodiment, a cooling air inlet line and a cooling air outlet line are provided in communication with the tank portion. This third embodiment of the wind turbine is used in stages six through ten, so that the compressed air outputted at the end of this staged compression line is approximately 3000 psi.

Lines of wind turbines, each formed from serially interconnected stage 1-10 wind turbines, may also be assembled into an array or a field of wind turbines, to provide greater capacity and output of compressed air. Preferably, the lines of serially interconnected wind turbines are arranged in parallel relation with respect to each other, to reduce wind turbulence and cross-currents between and among adjacent lines when the lines are directed into the prevailing winds. At the end of each line, the outputs of each respective stage 10 wind turbine are connected to a common manifold, which may then be delivered through a high pressure supply line to a compressed air reserve tank, for storage.

The reserve tank disclosed herein includes a central tank in communication with the incoming high pressure air supply line. The central tank is preferably vertically elongated, having a sidewall with a generally cylindrical configuration. One configuration for the sidewall is right-circular cylindrical. Or, the sidewall could be faceted. The preferred configuration for the sidewall is scalloped, for additional strength. In other words, the scalloped arrangement provides a plurality of arcuate segments, which may readily and inexpensively be assembled to form a continuous sidewall for the central tank.

The configuration of the sidewall of the central tank determines the configuration for a plurality of elongated ring tanks surrounding the central tank. The first, innermost ring tank, is concentric with and surrounding the sidewall of the central tank, and has a sidewall which is arranged and spaced from the sidewall of the central tank. The reserve tank also includes a plurality of like constructed but successively larger ring tanks, each successively arranged around the first ring tank and around each other to form entirety of the reserve tank.

The reserve tank also includes a plurality of pressure-actuated transfer valves. A first of such transfer valves has an inlet side in communication with the central tank and an outlet side in communication with the innermost ring tank. The first transfer valve is adapted to open and release compressed air from the central tank into the innermost ring tank, as long as a predetermined pressure differential exists between the central tank and the innermost ring tank. Additional transfer valves are also provided, each being successively arranged between adjacent successive ring tanks, having an inlet side in communication with an adjacent ring tank radially closer to the central tank and an outlet side in communication with an adjacent successive ring tank radially remote from the central tank.

Preferably, the reserve tank includes nine ring tanks, in which the compressed air in the central tank is approximately 3000 psi, and in which the predetermined pressure differential between each tank is approximately 300 psi. Owing to the presence and the function of the successive air transfer valves, the outermost ring tank stores compressed air at approximately 300 psi.

Lastly, for the production of electricity, compressed air or gas from the outermost ring tank drives one or more air turbines and respective electrical generators. The air outputted from each air turbine may simply be exhausted to the ambient air. Or, in a closed air or gas system, the outputted air may be collected and reintroduced to the input of the turbine air compressors in the stage 1 wind turbines, and re-utilized again.

BRIEF DESCRIPTION OF THE DRAWINGS

FIG. 1 is a side elevational view of a wind turbine, the representation of the elevator in broken line corresponding to its position during high wind conditions;

FIG. 2 is a side elevational view of the wind turbine of FIG. 1, but with the head portion of the wind turbine rotated 90° counter-clockwise, the representation of the elevator in broken line corresponding to its position during low or no wind conditions;

FIG. 3 is a top plan view of the wind turbine, the vertical output shaft for driving the turbine air compressor being shown in broken line;

FIG. 7A is a side cross-sectional schematic representation of a row of stage 10 wind turbines, the bulk of the upper head portions being removed for clarity, showing the compressed air lines feeding the reserve tank and interconnecting the ring-like tanks within the reserve tank;

FIG. 7B is a top cross-sectional schematic representation of the row of stage 10 wind turbines shown in FIG. 7A;

DETAILED DESCRIPTION OF THE PREFERRED EMBODIMENT

Figure 6A:
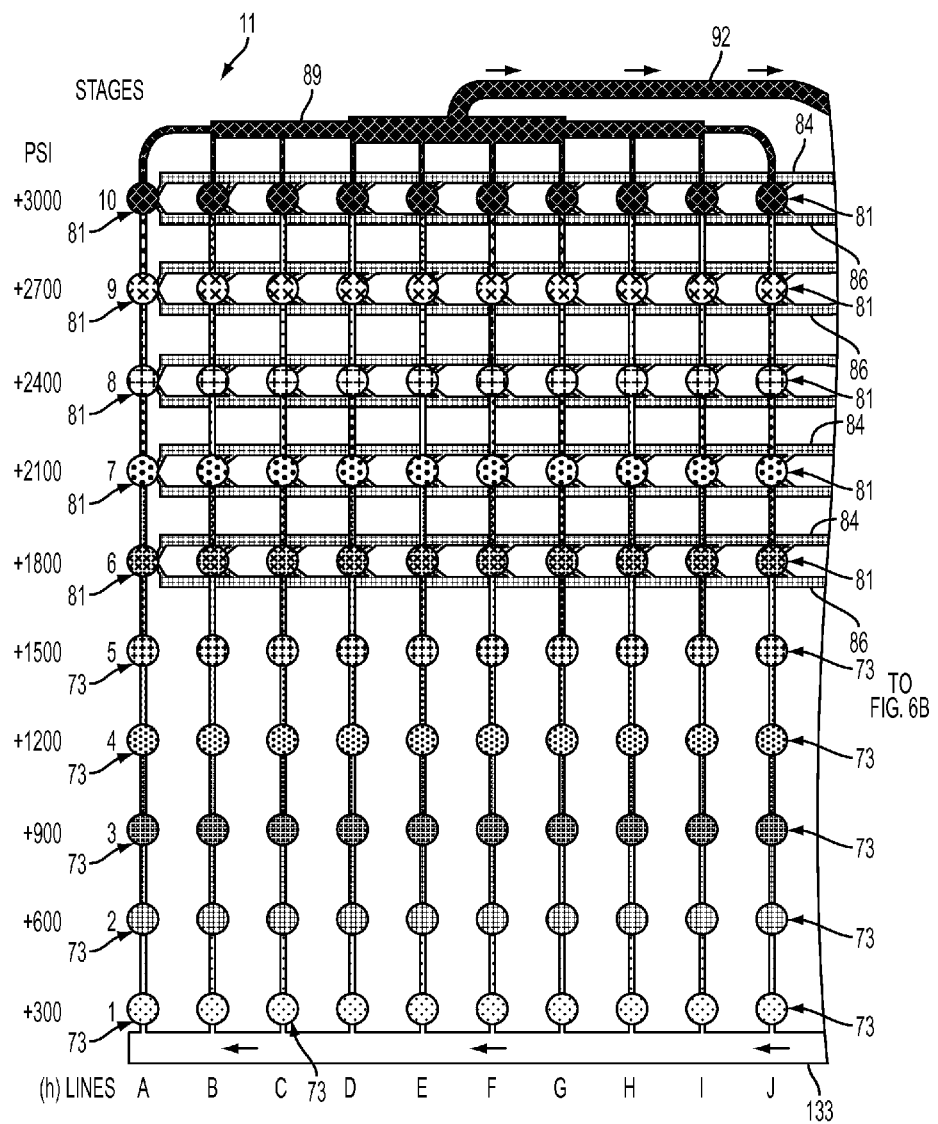
FIG. 6A is a schematic representation of an array of wind turbines arranged in stages 1-10 and lines A-J, with the symbols used representing respective pressures according to the legend in FIG. 6B.
Figure 6B:
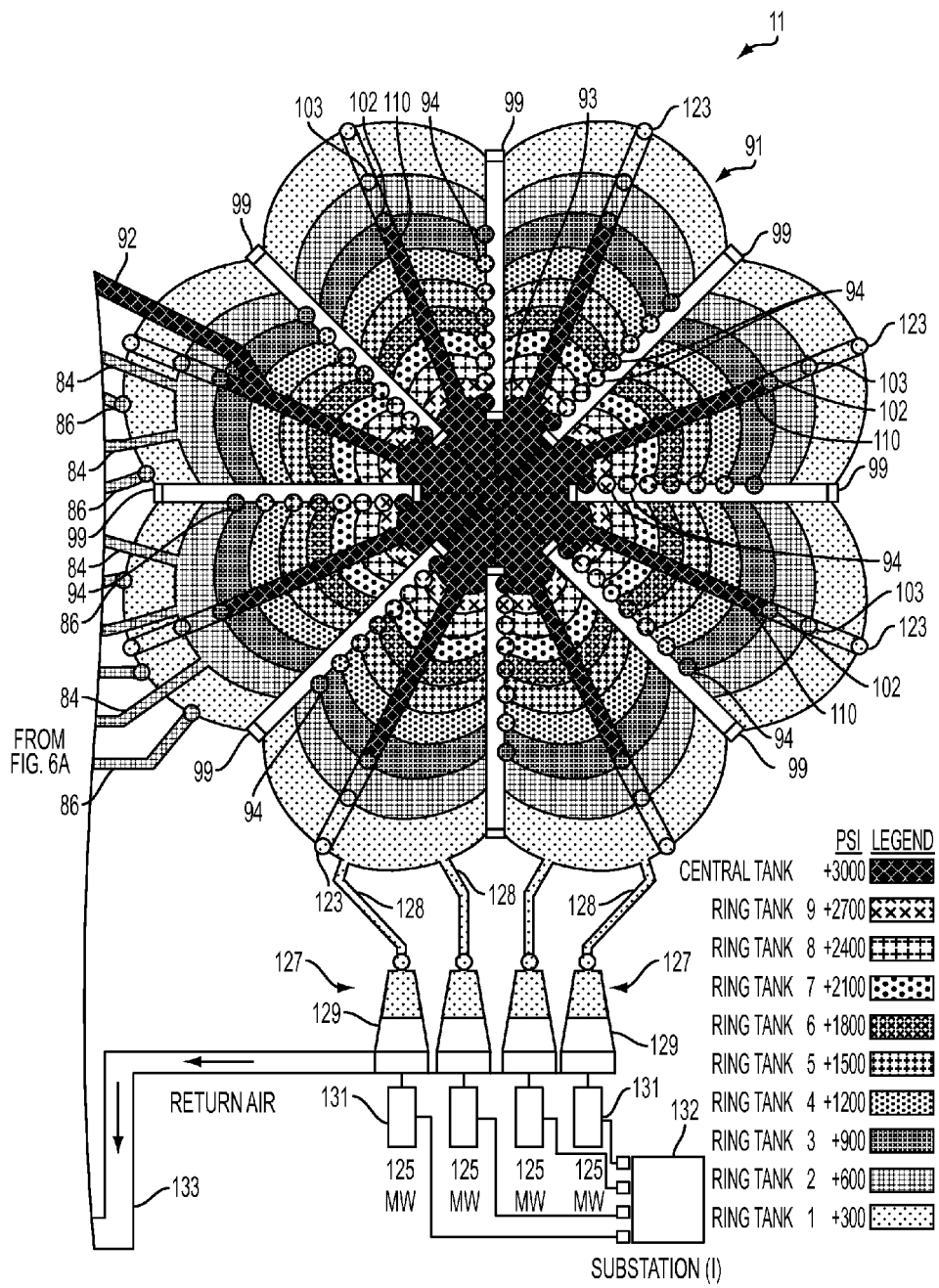
FIG. 6B is a schematic representation of the compressed air reserve tank, interconnected to the array of wind turbines in FIG. 6A, and showing a group of the air turbines connected to respective electrical power generators.

Turning now to the drawings, FIGS. 6A and 6B show the wind turbine power generation system 11 of the present invention. In general, FIG. 6A shows an array of wind turbines, each adapted and interconnected for staged compression to output very high pressure air, or another gas. FIG. 6B shows components adapted to store the compressed air or gas outputted by the wind turbines, and to convert the stored energy into electrical power.

Certain features and design aspects of a stage 1 wind turbine 12 are shown in FIGS. 1-5. All of the other wind turbines to be described in more detail herein, namely, stages 2-10, share these same features and design aspects reflected in the stage 1 wind turbine 12.

FIG. 1 generally depicts the wind turbine 12, including a head portion 13 having two or more propellers 14 extending radially from a hub 16. Hub 16 is mounted for rotation on a front end 17 of the head portion 13. A drive shaft 18 interconnects hub 16 with an input shaft 19 of a gear box 21. (See, FIG. 12)

A rear end 22 of the head portion 13, includes a rudder 23 and a fin assembly 24. Rudder 23 comprises a vertical member, having portions extending above and below fin assembly 24. Rudder 23 is effective to steer wind turbine 12 with its front end 17 headed into the incoming wind at all times. Rudder 23 also acts to reduce wind turbulence, some of which may be caused by propellers 14, so that downwind wind turbines will work more effectively. Reducing wind turbulence is especially important where an array of wind turbines is provided, as will be illustrated and discussed below.

Fin assembly 24 has a horizontal portion 26 with a trailing edge 27, and elevator 28 pivotally attached to trailing edge 27. During low, or no wind conditions, elevator 28 is directed downwardly, as shown in FIG. 1. However, during strong winds, elevator 28 is urged by wind forces to rotate upwardly, as shown in broken line FIG. 1. The reverse circumstance is shown in FIG. 2, where the broken line representation of the elevator 28 indicates a calm or quiescent wind condition.

Figures 4, 5:
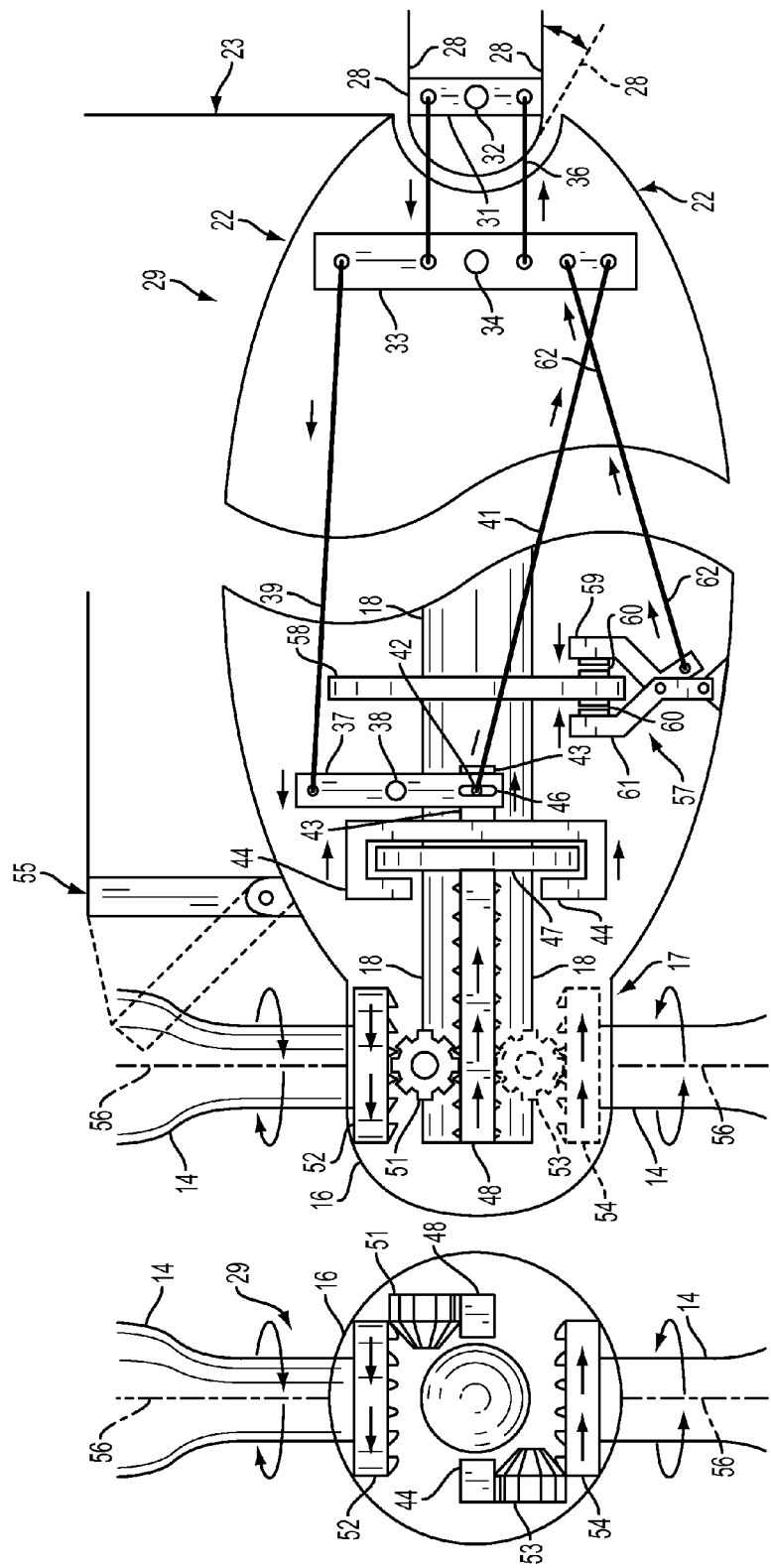
FIG. 4 is a front elevational view, comprising a pictorial representation of part of the feathering mechanism for the propellers, showing the ends of the racks, the bevel gears, and the crown gears.
FIG. 5 is a side elevational view, comprising a pictorial representation of the feathering and braking mechanisms for the propellers, showing the relative positions and movement of the elements during a high wind condition.

Making reference to FIGS. 4 and 5, wind turbine 12 also includes propeller feathering and braking means 29, responsive to elevator 28. For simplicity of explanation, this particular arrangement pertains to a wind turbine head portion having only two propellers 14. With apparent modifications, the same arrangement can be adapted for wind turbine head portions having three or more propellers 14.

Propeller feathering and braking means 29 is effective to rotate propellers 14 out of aerodynamic engagement with the incoming wind, and to brake drive shaft 18 in response to strong wind forces. Starting at the right hand side of FIG. 5, a pivotally mounted first lever arm 31 is attached to elevator 28. A shaft 32 provides the pivot means for lever arm 31 and elevator 28. In FIG. 5, the elevator is also shown in broken line, representing a calm wind condition. It should be understood that first lever arm 31 would be rotated clockwise by the downward rotation of elevator 28, if the wind were calm.

A second lever arm 33 is pivotally mounted by means of a shaft 34, within the rear end 22 of the head portion 13. Connector rods 36, mechanically link the rotational movement of first lever arm 31 with that of second lever arm 33. It should be noted at this point that the directional arrows shown in FIGS. 4 and 5, are indicating the relative movement of certain interconnected structures, as the propeller feathering and braking means 29 approaches a fully operational position.

A third lever arm 37 is pivotally mounted by means of a shaft 38, within the front end 17 of the head portion 13. One connector rod 39 extends from second lever arm 33 and is directly connected to the upper end of third lever arm 37. Another connector rod 41 extends from second lever arm 33 and is connected to a pin 42 mounted on a bar 43. Bar 43, in turn, is connected to a housing 44. A slot 46 is provided in third lever arm 37, to accommodate the relative movement of pin 42 as bar 43 is translated forwardly or rearwardly.

Housing 44 is configured so as to surround rack coupler 47. As housing 44 translates forwardly or rearwardly, rack coupler 47 is urged in the same direction. Extending forwardly from rack coupler 47 are a first rack 48 and a second rack 49, arranged on either side of hub 16 in parallel relation. (See, FIG. 4). First rack 48 rotatably drives a first bevel gear 51, which in turn engages a preferably semi-circular, first crown gear 52 extending at least part of the way around the base of a respective propeller 14. In like fashion, second rack 49 rotatably drives a second bevel gear 53, which in turn engages a semi-circular, second crown gear 54 extending at least part of the way around the base of a respective propeller 14.

The above-described means for interconnecting the elevator 28 of the fin assembly 24 with each propeller 14, is effective to feather the propellers in response to strong wind conditions, thereby protecting the wind turbine 12 from self destruction. When elevator 28 is oriented in a downwardly direction position, the propellers 14 are in a first rotational position about their axes 56, fully engaging incoming winds. When elevator 28 is oriented in a substantially horizontal position, the propellers 14 are in second rotational position about their axes 56, substantially or completely disengaged from the aerodynamic forces of incoming wind.

As an additional measure of safety, a brake 57 is provided as part of the propeller feathering and braking means. Brake 57 comprises a disc 58, mounted on drive shaft 18 for rotation therewith. A right caliper 59 and a left caliper 61 are pivotally mounted so that brake pads 60 engage disc 58, when a rearwardly directed force is applied by a connector rod 62. Because connector rod 62 is attached to the second lever arm 33 at a point radially inwardly from connector rod 41, it does not travel as much distance as connector rod 41 for a given extent of rotation of arm 33. Consequently, feathering of propellers 14 will occur before the brake 57 actuates and begins applying frictional forces to disc 58. But during extreme wind conditions, brake 57 will actuate and assist further in controlling the rotational speed of the propellers 14, the shaft 18, and all other mechanical components connected to them.

A derrick 55, having a retracted position and an extended position, may be mounted on the top of the head portion 13, in longitudinal alignment therewith. In an extended position, derrick 55 is useful for the construction and maintenance of the head portion, having the capability of lifting its major components, for example, propellers 14, gear box 21, rudder 23, and fin assembly 24. Having such a convenient means located on the head portion 13 itself, to remove and install major components, obviates the need for a large crane working from ground level, to perform the same operations. Thus, both the presence and the location of built-in derrick 55 makes assembly and maintenance of the wind turbine 12 less expensive and more safe than conventional means used today.

Wind turbine 12 also includes a storage tank portion 63 having an upper end 64 and a lower end 66. Head portion 13 is pivotally mounted on the upper end 64 of said storage tank portion 63, for rotation in any direction. Making particular reference to FIG. 10, storage tank portion 63 has an inner volume 67 for the storage of compressed air. A turbine air compressor 65 is mounted within upper end 64, having an upper air inlet 68 in communication with ambient air outside of storage tank portion 63, and a lower air outlet 69 in communication with the inner volume 67. Air outlet 69 is provided with a check valve 71, positioned so as to prevent reverse air flow through air compressor 65. Turbine air compressor 65 is rotatably driven by an output shaft 72, extending vertically and downwardly from gear box 21 in head portion 13.

It should be noted that after the stage 1 wind turbine 12 has been operating for a sufficient period of time, the entire inner volume 67 of storage tank portion 63 contains compressed air which is maintained at approximately 300 psi. A legend, adjacent FIG. 10, indicates the different visual symbols used to indicate pressures ranging from 300 psi (Stage 1) to 3000 psi (Stage 10).

Figure 10:
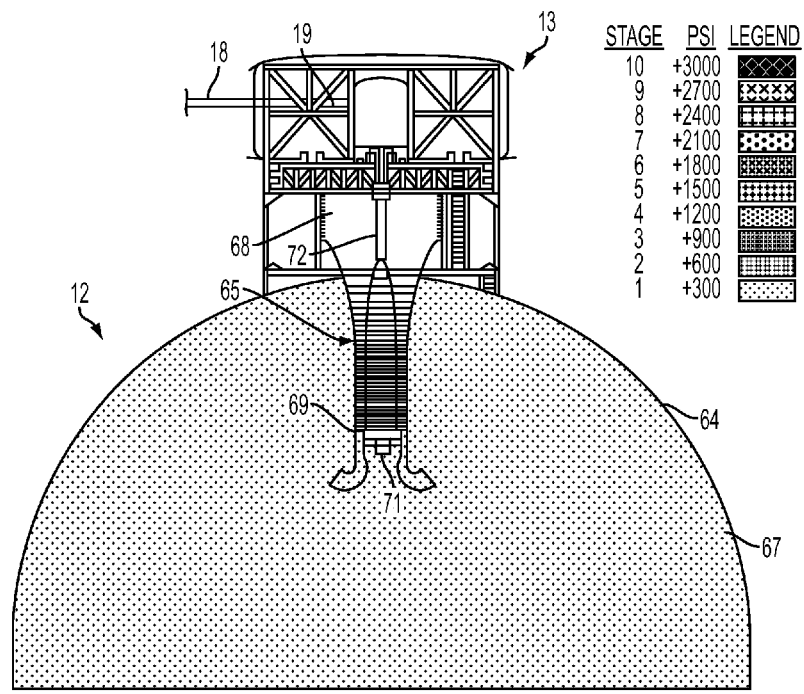
FIG. 10 is a fragmentary cross-sectional view of the upper end of the tank portion and a part of the head portion of a stage 1 wind turbine having an inlet in communication with ambient air.

At this juncture, it should also be noted that the wind turbine power generation system 11 may be operated as an "open system", or as a "closed system." If it is operated as an "open system", then the stage 1 wind turbine 12 will have the upper air inlet 68 of air compressor 65 in communication with the ambient air, as indicated above, and as shown in FIG. 10.

However, it may be desirable to operate system 11 as a "closed system", where the air or gas used as the motive force is recycled, again and again. This may provide a number of advantages, as the air or gas may be cleaned and dehumidified, so that less corrosion and abrasion of bearings and other moving parts will occur. Also, gases different than air may be used, such as $CO_2$ and other mixed gases, providing the ability to tailor the gas used for optimum performance of turbines, valves, and the like. Because of this flexibility in the system 11, it should be understood that all references to the terms "air" and "gas" herein are interchangeable, and such references are used without limitation.

Figure 11:
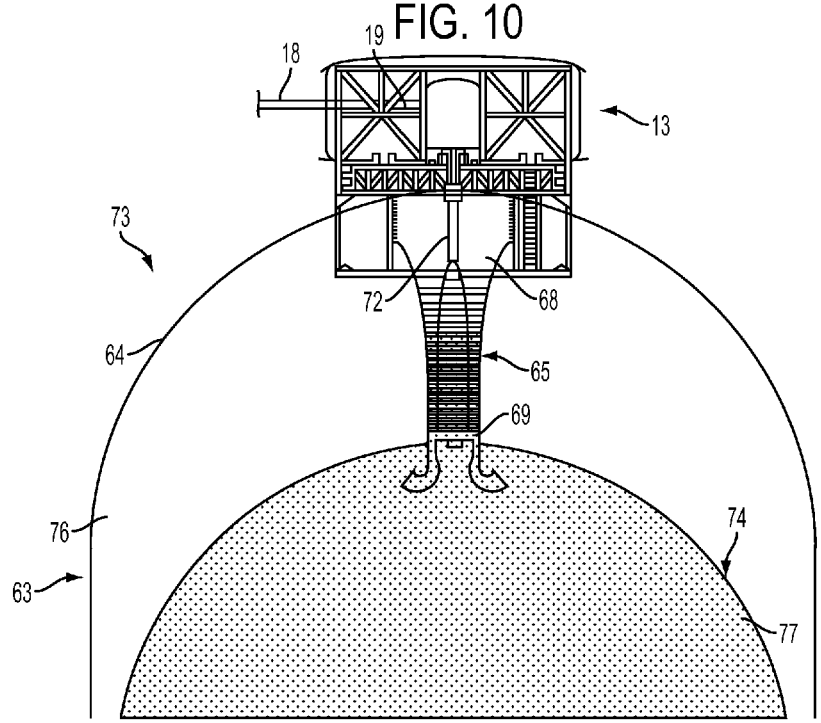
FIG. 11 is a fragmentary cross-sectional view as in FIG. 10, showing a stage 2 through stage 5 wind turbine with a tank portion having an inner tank with a first volume and a second volume.

In the event that a "closed system" is employed, a stage 1 wind turbine 73, as shown in FIG. 11 will be used. Wind turbine 73, a second embodiment of the wind turbines disclosed herein, is different in several respects from wind turbine 12. The inner volume of the storage tank portion 63 of wind turbine 73, includes an inner tank 74 defining a first volume 76 outside inner tank 74, and a second volume 77 within inner tank 74. In addition, the turbine air compressor 65 is located within the first volume 76 having its air inlet 68 in communication with the first volume 76, and in which the air outlet 69 of air compressor 65 is in communication with second volume 77. The air compressor 65 of wind turbine 73 produces a pressure differential between first volume 76 and second volume 77 of approximately 300 psi. In the example of wind turbine 73 shown in FIG. 11, the pressure in the first volume 76 is at ambient pressure, and the pressure in the second volume is 300 psi.

Because the system 11 shown in FIG. 6A is a "closed system", it employs a plurality of wind turbines 73 as its stage 1 wind turbines. If system 11 shown in FIG. 6A were modified to be an "open system", each of the air compressors 65 in the stage 1 wind turbines would be open to the ambient air, and consequently a plurality of wind turbines 12 would be used as the stage 1 wind turbines.

As is evident in FIG. 6A, pluralities of wind turbines may be arranged in lines A-J. Each line A-J, includes a plurality of wind turbines, arranged in serially interconnected fashion for staged compression, comprising ten wind turbines identified as stage 1 through stage 10, inclusive. Having discussed the two versions of stage 1 wind turbines, we can now turn our attention to stage 2-5 wind turbines. The second embodiment wind turbine, namely, wind turbine 73, is used for all stage 2-5 wind turbines.

In the staged compression arrangement for wind turbines disclosed herein, the output from the second volume 77 of one wind turbine 73 is delivered to the first volume 76 of the next wind turbine 73. Air pressures within the serially interconnected wind turbines 73 are therefore successively increased, in 300 psi increments. Specifically, air pressures are increased from the approximately 300 psi outputted by the stage 1 wind turbine, to approximately 1500 psi outputted by the stage five wind turbine.

Figure 12:
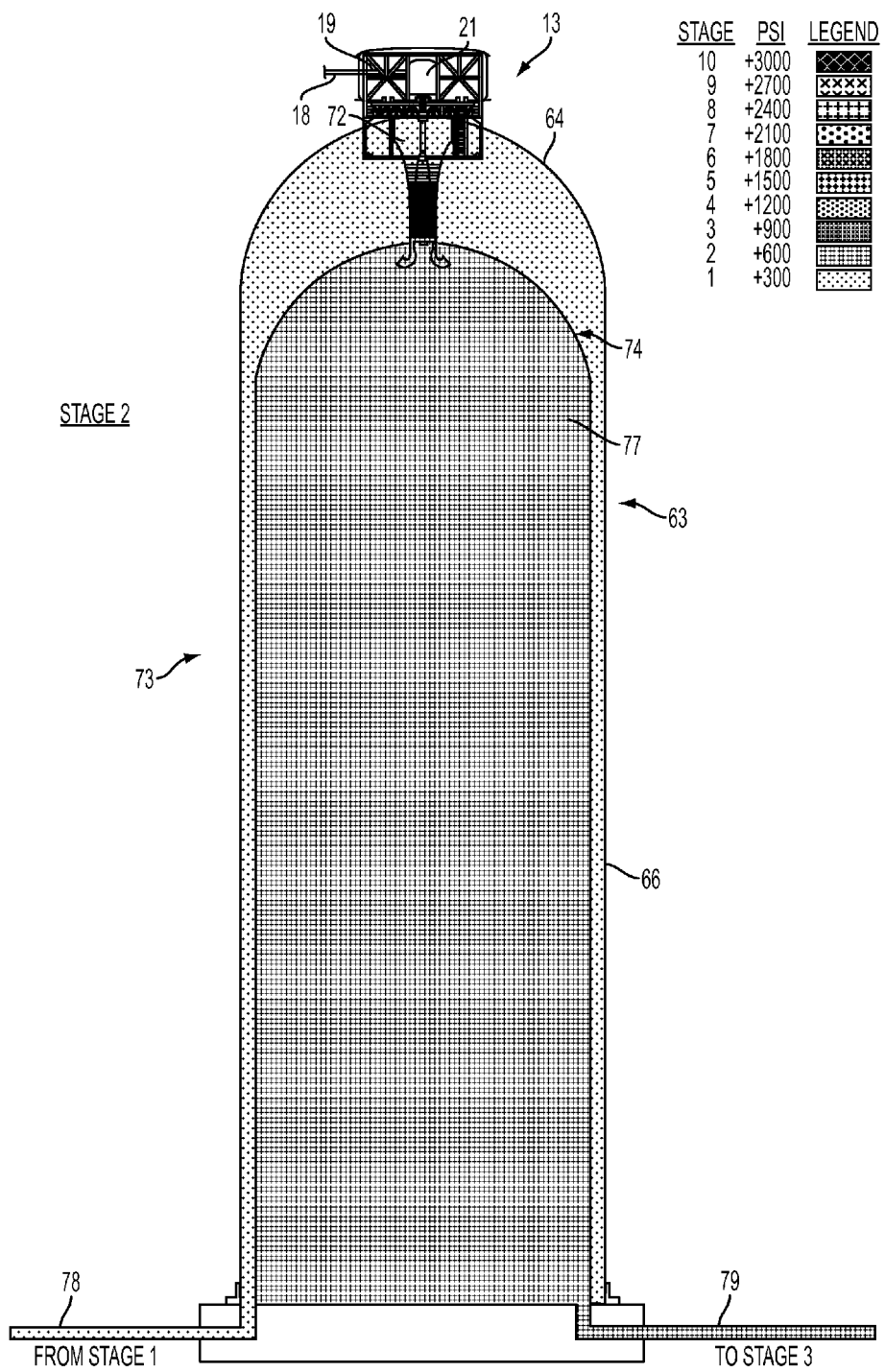
FIG. 12 is a fragmentary cross-sectional view of the wind turbine of FIG. 11, showing the complete tank portion and the associated air supply lines.

FIG. 12 shows a stage 2 wind turbine 73, having a low pressure air supply line 78 in communication with first volume 76, and a high pressure air supply line 79 in communication with second volume 77. As indicated by the symbols within the lines and the volumes, the air pressure in low pressure air supply line 78 coming from the stage 1 wind turbine is 300 psi. The air pressure in the high pressure air supply line going to the stage 3 wind turbine is 600 psi. Thus, it will be appreciated that through this successive and serial arrangement of interconnected wind turbines, the air pressure is increased incrementally with each stage. Stages 3-5 are serially interconnected as shown in FIG. 6A, so the stage 5 wind turbine 73 is outputting approximately 1500 psi. Such an arrangement provides a significant amount of compressed air storage, as each stage includes a large storage tank portion 63. In addition, it is submitted that by incrementally increasing the air pressure through successive stages, instead of increasing the air pressure in a single stage, there is less strain on components, and reliability will be enhanced.

Attention will now be directed to the stage 6-10 wind turbines. With increasing air pressures come increasing temperatures, which can adversely affect the efficiency and the reliability of turbine air compressors. Thus, the need exists for a cooling mechanism within the storage tank portion 63 of successive wind turbines past the stage 5 wind turbines 73.

Figure 13:
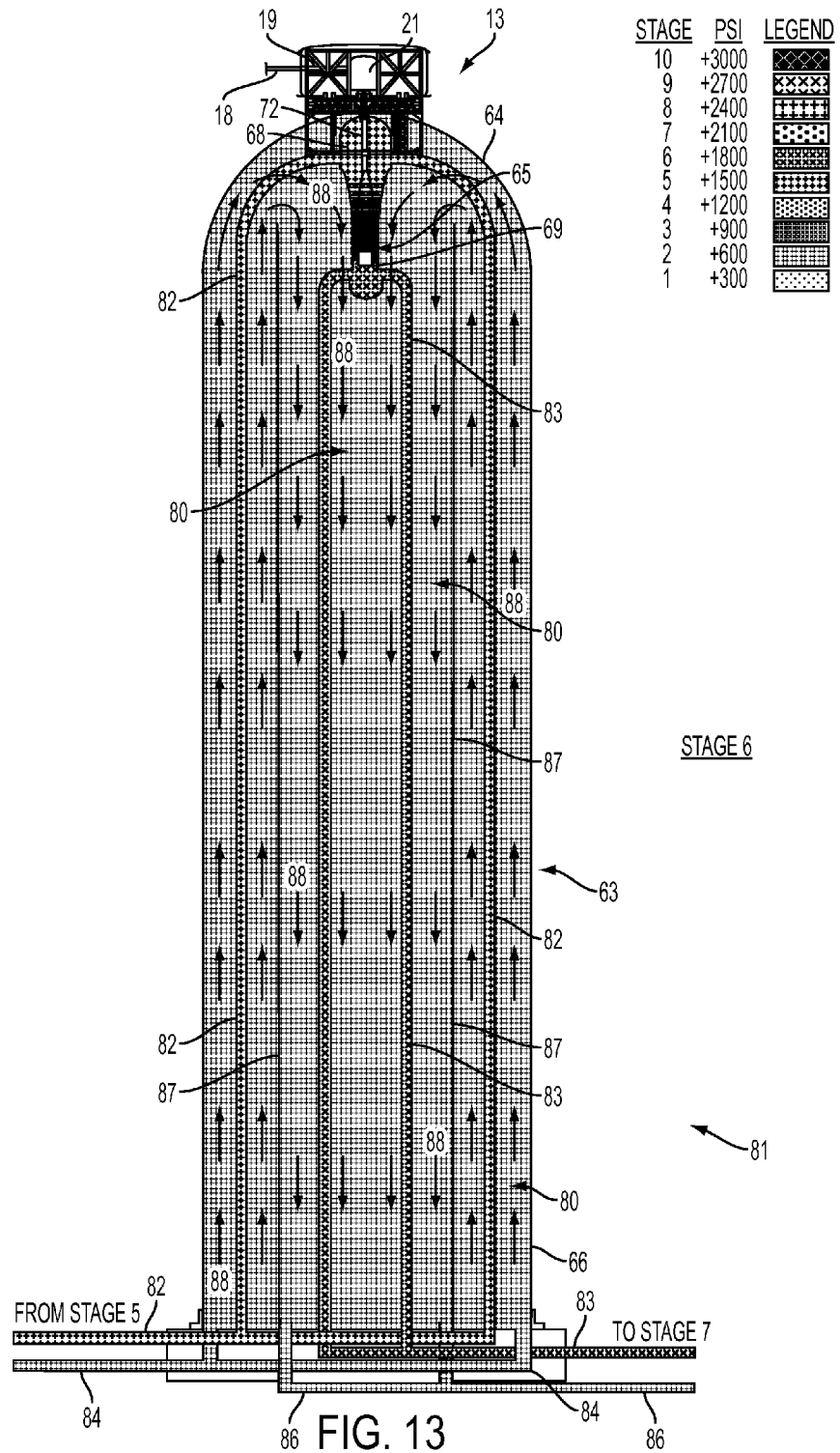
FIG. 13 is a fragmentary cross-sectional view of a stage 6 wind turbine, having an internal wall defining cooling air ducts effective to confine and direct cooling air around a 1500 psi low pressure air supply line and a 1800 psi high pressure air supply line.
Figure 14:
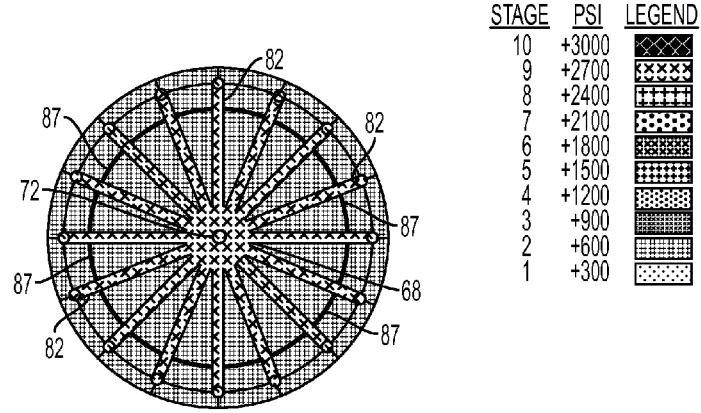
FIG. 14 is a cross-sectional view, taken on the line 14-14 shown in FIG. 17.
Figure 15:
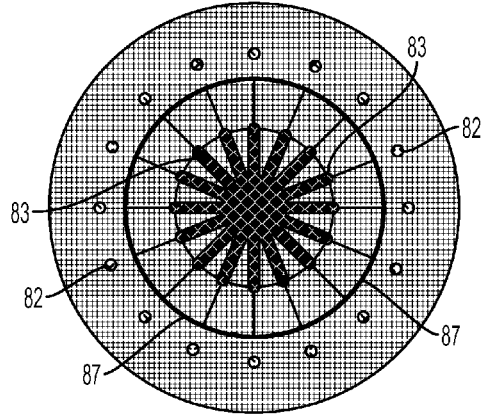
FIG. 15 is a cross-sectional view, taken on the line 15-15 shown in FIG. 17.
Figure 16:
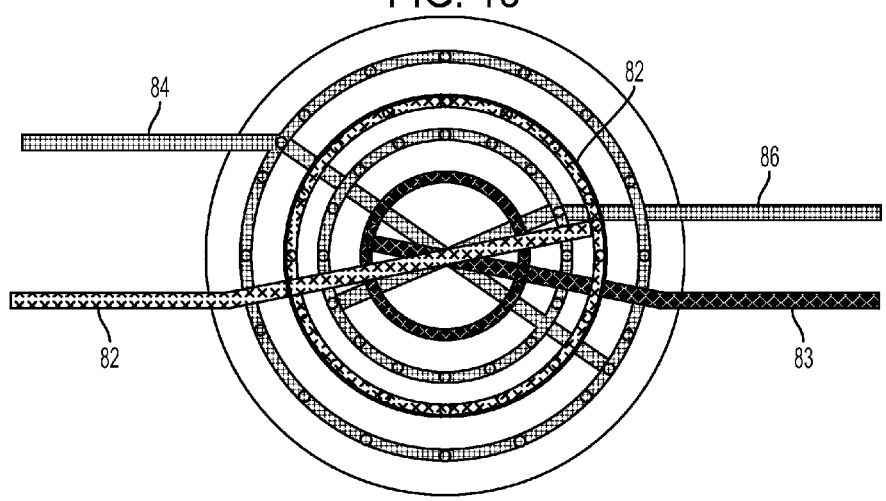
FIG. 16 is a cross-sectional view, taken on the line 16-16 shown in FIG. 17; and, FIG. 17 is a fragmentary cross-sectional view of a stage 10 wind turbine, producing compressed air of approximately 3000 psi outputted to a manifold.

In a third embodiment wind turbine 81, such a cooling mechanism for the compressed air is provided. As shown in the stage 6 wind turbine 81 in FIG. 13, the air inlet 68 to the turbine air compressor 65 is in communication with a low pressure air supply line 82. Low pressure air supply line 82 extends from the second volume and the associated air supply line of a preceding wind turbine, in this case the downstream stage 5 wind turbine 73. The air outlet 69 from the turbine air compressor 65 is in communication with a high pressure air supply line 83. High pressure air supply line 83 extends outside an inner volume 80 of the storage tank portion 63 of wind turbine 81, and is delivered to the upstream stage 7 wind turbine 81.

Storage tank portion 63 further includes a cooling air inlet line 84 and a cooling air outlet line 86 in communication with the inner volume 80. Wind turbine 81 further includes at least one vertical inner wall 87 defining cooling air ducts or either side thereof, effective to confine and direct cooling air around low pressure air supply line 82 and high pressure air supply line 83. Arrows 88 indicate the upward and downward direction of travel of cooling air through the air ducts. The cooling air passing through inlet line 84, inner volume 80, and outlet line 86 comes from a 600 psi line interconnected to a compressed air reserve tank, to be discussed below.

As indicated by reference to the pressure Legend, air incoming to the stage 6 wind turbine 81 is 1500 psi. Since turbine air compressor 65 provides a 300 psi pressure increase to the incoming air, the air outputted from the stage 6 wind turbine is approximately 1800 psi. With the cooling provided by relatively cool air passing through the air ducts defined by wall 87, turbine air compressor 65 is able to operate more efficiently and with higher reliability, than it would without such cooling.

As with the other embodiments of the wind turbines herein, each third embodiment wind turbine 81 provides staged compression, increasing the pressure of the air incoming from the preceding wind turbine by approximately 300 psi. This third embodiment of the wind turbine 81 is used in stages six through ten, so that the compressed air outputted at the end of this staged compression line is approximately 3000 psi. FIG. 17 shows a stage 10 wind turbine 81, having an identical structure to the preceding four stages. As indicated, the compressed air pressure incoming from the stage 9 wind turbine 81 is approximately 2700 psi. The only difference with a stage 10 wind turbine, is that its output does not go to a successive wind turbine. The outputted air pressure of 3000 psi is directed to a manifold 89.

Lines of wind turbines, A-J, each formed from serially interconnected stage 1-10 wind turbines, may also be assembled into an array or a field of wind turbines, to provide greater capacity and output of compressed air. (See, FIG. 6A). Preferably, the lines A-J of serially interconnected of wind turbines 73 and 81, are arranged in parallel relation with respect to each other, to reduce wind turbulence and crosscurrents between and among adjacent lines. At the end of each line, the outputs of each respective stage 10 wind turbine are connected to the common manifold 89, which may then be delivered through a high pressure supply line to a compressed air reserve tank 91, for storage and utilization compressed air as needed. This arrangement allows the system 11 to be scaled upwardly or downwardly in size depending upon the electrical power output target, while retaining compressed air storage capabilities for running the power generation aspect of the system 11 for extended minimal wind periods.

Reserve tank 91 comprises a central tank 93 in communication with high pressure supply line 92, so air within it is maintained at 3000 psi. Central tank 93 is vertically elongated and has an outer sidewall with a generally cylindrical configuration. (See, FIGS. 6B and 7A). There are, however, small convex undulations apparent in the sidewall which are preferably included to increase its strength.

Reserve tank 91 also includes a plurality of concentric ring-like tanks. The first innermost ring tank being ring tank 9, and the last outermost ring tank being ring tank 1 Innermost ring tank 9 has an outer sidewall which is preferably arranged to follow the configuration of and be spaced from, the shared outer sidewall of central tank 93. Progressing radially outwardly, successive ring tanks 8 through 1, are similarly arranged around ring tank 9 and around each other to form the reserve tank 91.

Ring tanks 1 through 9 present a scalloped configuration, selected to provide maximum strength and relative ease of assembly, while maintaining a generally cylindrical configuration for the reserve tank 91. All of the inner ring tanks 2 through 9, are supported by pressures provided by compressed air contained in each adjacent tank. In other words, ring tank 9 contains air pressurized at 2700 psi, and it partly supports the 3000 psi forces from central tank 93 and is partly supported by the 2400 psi forces from ring tank 8. Consequently, central tank 93 and ring tank 9, only need to contain a pressure differential of 300 psi, instead of the respective 3000 psi and the 2700 psi pressures, they actually contain. This concentric and co-supportive construction for ring tanks 1 through 9, allows lighter and less expensive material to be used, while still maintaining structural integrity and the desired functionality of reserve tank 91.

It should be noted that the sidewalls of the ring tanks may be, but do not have to be, arranged in equally spaced relation. It may be desirable to size central tank 93 so that its volume is substantially greater than that of the ring tanks, and to make the volumes of the ring tanks decrease differentially, from the central tank 93 outermost ring tank 1.

Figure 8:
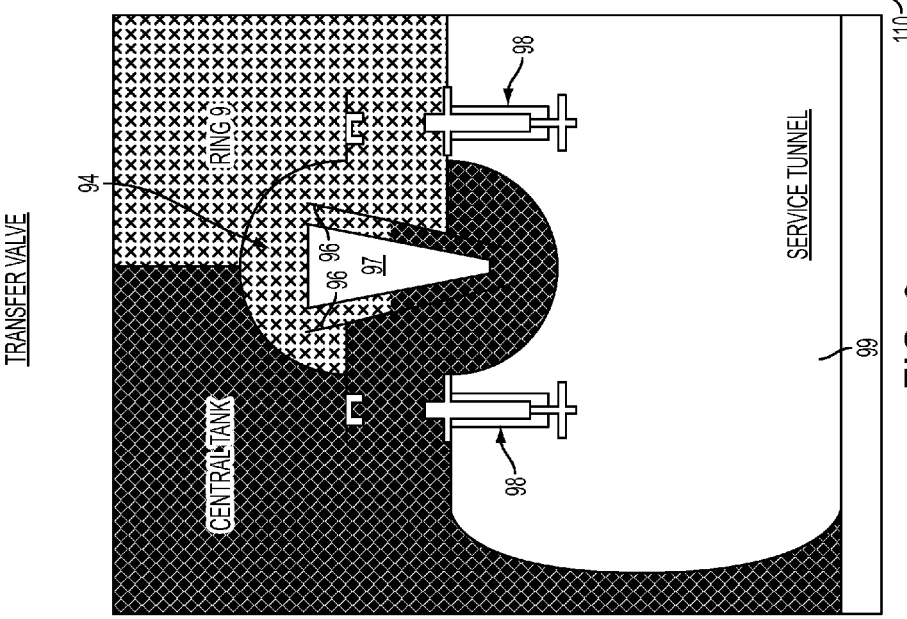
FIG. 8 is a cross-sectional schematic representation of a typical compressed air transfer valve, interconnecting the central tank with adjacent ring tank 9.

Ring tank 9 is pneumatically in communication with central tank 93, through a pressure-actuated transfer valve 94, shown in FIG. 8. Transfer valve 94 includes a cone-shaped valve seat 96 and a cone-shaped valve member 97. The principle of operation of transfer valve 94 is to open whenever the pressure differential between ring tank 9 and central tank 93 reaches approximately 300 psi. At that point, the pressure differential is sufficient to lift valve member 97 away from valve seat 96, allowing the higher pressured air from central tank 93 to be transferred into ring tank 9. This is accomplished by selecting the weight of valve member 97 so that the desired lifting action and valve opening will occur when the pressure differential between the two tanks is reached. Once the pressure differential drops below 300 psi, valve member 97 again lowers to rest within valve seat 96, closing transfer valve 94 and preventing further transfer of compressed air. Because the operation of transfer valve 94 is gravity based, it is simple and reliable in operation, requiring very little maintenance. However, in the event maintenance is required, gate valves 98, accessible through a service tunnel 99, may be closed to isolate transfer valve 94 from the high pressures.

Making reference now to FIGS. 6B and 7A, it should be noted that eight service tunnels 99 are provided within reserve tank 91, extending radially from an inner sealed end, each slightly penetrating central tank 93. It should also be noted that along each service tunnel 99, transfer valves 94 are located between successive ring tanks until ring tank 1 is reached. In other words, each service tunnel 99 has nine transfer valves 94, located between adjacent ring tanks up to and including the interface between ring tank 2 and ring tank 1. This series of pressure-actuated transfer valves 94 is effective progressively to drop tank pressure in 300 psi increments, first from the central tank 93 and then between adjacent tanks, so that ring tank 1 has a nominal pressure of 300 psi.

Figure 9:
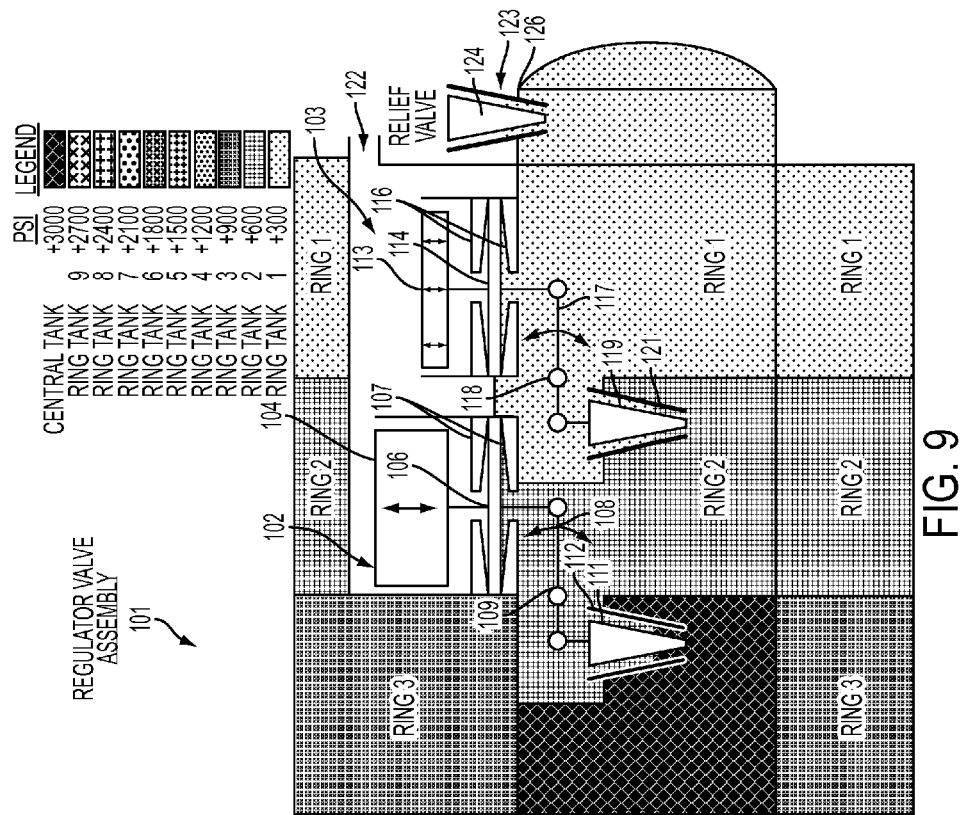
FIG. 9 is a cross-sectional schematic representation of a by-pass line, an air regulator valve assembly, an inner regulator valve interconnecting the central tank with ring tank 2, and an outer regulator valve interconnecting ring tank 2 with outermost ring tank 1.

FIG. 9 is representative of a regulator valve assembly 101, including an inner regulator valve 102 and an outer regulator valve 103 Inner regulator valve 102 includes a weight member 104, a diaphragm 106, upper and lower diaphragm keepers 107, a pivoted lever arm 108, a pivot 109, a valve member 111, and a valve seat 112. The entry side of valve seat 112 is in communication with a by-pass line 110, in communication with the central tank 93. (See, FIG. 7A).

The purpose of by-pass line 110 is to introduce stored compressed air directly into ring tank 2, in the event the pressure therein drops to 595 psi. For example, if there is little or no wind for a prolonged period of time, and the compressed air within ring tank 2 is utilized to produce electrical power, the pressure therein will eventually drop to 595 psi. But since the reserve tank 91 has ample storage of compressed air, by-pass line 110 and inner regulator valve 102 will act to restore the air pressure in ring tank 2 to 600 psi.

Regulator valve 102 operates with reference to ambient air pressure. Accordingly, through a passageway 122, air at ambient pressure is allowed to act upon the upper side of diaphragm 106. The weight of member 104 is such that as long as the air pressure within ring tank 2 is above 595 psi, diaphragm 106 is in equilibrium and valve member 111 will remain lodged within valve seat 112. However, when the pressure drops to 595 psi, the weight member 104 causes the diaphragm 106 to move inwardly toward tank ring 2, and the pivoted shaft 108 to rotate in clockwise fashion. This, in turn, will cause valve member 111 to lift out of the valve seat 112, allowing compressed air from the central tank 93 and by-pass line 110, to enter tank ring 2 to raise the pressure back to 600 psi.

Similarly, outer regulator valve 103 includes a weight member 113, a diaphragm 114, upper and lower diaphragm keepers 116, a pivoted lever arm 117, a pivot 118, a valve member 119, and a valve seat 121. The purpose of outer regulator valve 103 is to introduce stored compressed air directly into ring tank 1 from ring tank 2, in the event the pressure therein drops to 295 psi.

As with air regulator valve 102, air regulator valve 103 operates with reference to ambient air pressure. Passageway 122 exposes the upper side of diaphragm 114 to such ambient pressure. The weight of member 113 is selected so that as long as the air pressure within ring tank 1 is above 295 psi, diaphragm 114 is in equilibrium and valve member 119 will remain seated within valve seat 121. However, when the pressure drops to 295 psi, the weight member 113 causes the diaphragm 114 to move inwardly toward tank ring 1, and the pivoted shaft 117 to rotate in clockwise fashion. This will cause valve member 119 to lift out of the valve seat 121, allowing compressed air from the ring tank 2 to enter ring tank 1 and raising the pressure back to 300 psi.

It should be understood, from reference to FIGS. 6B and 7A, that the central tank 93, and each ring tank 9 through 3, have at least one, and preferably eight, respective by-pass lines and associated regulator valve assemblies 101, identical to that set forth above and with a structure identical to that shown in FIG. 9. For the sake of clarity, no attempt will be made to explain the structure and operation of each of the by-pass lines and the regulator valve assemblies, as they are all identical, excepting the connection point to a respective ring tank.

In the event that the air pressure within ring tank 1 substantially exceeds 300 psi, a pressure relief valve 123 is provided, having an inlet in communication with ring tank 1. Pressure relief valve 123 includes a valve member 124, and a valve seat 126. A pressure relief valve 123 is included as part of each regulator valve assembly 101. (See, FIGS. 6B and 9).

As explained above, stage 6 through stage 10 wind turbines 81 all have cooling air inlet lines 84 and cooling air outlet lines 86. Each cooling air inlet line 84 is in communication with ring tank 2, and each cooling air outlet line 86 is in communication with ring tank 1. (See, FIGS. 6A and 6B). As the compressed air is successively transferred outwardly from ring tank to ring tank, it cools. Therefore, the compressed air in ring tank 2 is significantly cooler than the compressed air being produced in the stage 6 through stage 10 wind turbines, and the cooling air increases the efficiency of the turbine air compressors in those wind turbines. After the heat has been transferred to the cooling air, it is returned to ring tank 1, through air outlet lines 86. In this manner, the heat generated through the compression process is retained, to increase the efficiency of the power generation system 127.

FIG. 6B shows the basic components of the power generation system 127. Supply lines 128 interconnect ring tank 1 with turbines 129. In this manner, compressed air at 300 psi is consistently delivered to turbines 129, as long as there is a supply of compressed air in reserve tank 91. The turbines 129 convert the force of the compressed air into rotary motion, driving electrical generators 131. It is submitted that generators 131 for a typical installation, would have on the order of 125 MW output capabilities, their combined power output being delivered to a power substation 132.

As was discussed above, if the power generation system 11 is a "closed system" design, the air or gas expended from turbines 129 would be routed through return line 133, to the inlets 68 of the turbine air compressors 65. If the power generation system 11 is an "open system" design, the air or gas expelled from turbines 129 would simply be released to the ambient air.

What is claimed is:

1. A wind turbine comprising;
   a. a head portion having at least two propellers extending radially from a hub, said at least two propellers having respective longitudinal axes and being mounted to said hub for rotation about said axes between a first rotational position where said propellers are fully engaged with oncoming wind and a second rotational position where said propellers are minimally engaged with incoming wind, said hub being mounted for rotation on a front end of said head portion, a drive shaft interconnecting said hub with an input shaft of a gear box, a rudder and fin assembly on a rear end of said head portion, said rudder comprising a vertical member, said fin assembly having a horizontal portion with a trailing edge, and an elevator pivotally attached to said trailing edge, and a propeller feathering and braking system, said feathering and braking system comprising means interconnecting said elevator of said fin assembly with each of said propellers adjacent said hub, whereby when said elevator is in a downwardly directed position said propellers are in said first position, and when said elevator is in a substantially horizontal position said propellers are in said second position;
   b. a turbine air compressor, said compressor having an upper air inlet and a lower air outlet, said air outlet being provided with a check valve, said turbine air compressor being driven by an output shaft of said gear box;
   c. a storage tank portion having an upper end and a lower end, said head portion being pivotally attached to said upper end of said storage tank portion, said storage tank portion having an inner volume for the storage of compressed air, said turbine air compressor being mounted within said upper end of said storage tank portion with said upper air inlet being in communication with ambient air outside said tank portion and said lower air outlet being in communication with said inner volume.

2. A wind turbine as in claim 1 in which said braking system comprises a disc mounted on said drive shaft between said hub and said gear box, said braking system further comprising caliper means responsive to said interconnecting means, for selectively engaging opposing sides of said disc when said elevator approaches said substantially horizontal position.

3. A wind turbine as in claim 1 in which said turbine air compressor delivers air through its air outlet at approximately 300 psi.

4. A wind turbine comprising;
   a. a head portion having at least two propellers extending radially from a hub, said hub being mounted for rotation on a front end of said head portion, a drive shaft interconnecting said hub with an input shaft of a gear box, and a rudder and fin assembly on a rear end of said head portion, said rudder comprising a vertical member, said fin assembly having a horizontal portion with a trailing edge, and an elevator pivotally attached to said trailing edge;
   b. a turbine air compressor, said compressor having an upper air inlet and a lower air outlet, said air outlet being provided with a check valve, said turbine air compressor being driven by an output shaft of said gear box;
   c. a storage tank portion having an upper end and a lower end, said head portion being pivotally attached to said upper end of said storage tank portion, said storage tank portion having an inner volume for the storage of compressed air in which said inner volume includes an inner tank, said inner tank defining a first volume outside said inner tank and a second volume within said inner tank, and in which said air compressor is located within said first volume having its air inlet in communication with said first volume, and in which said air outlet of said air compressor is in communication with said second volume.

5. A wind turbine as in claim 4 in which said air compressor produces a pressure differential between said first volume and said second volume of approximately 300 psi.

6. A wind turbine as in claim 4 including a low pressure air supply line in communication with said first volume, and a high pressure air supply line in communication with said second volume.

7. A wind turbine comprising:
   a. a head portion having at least two propellers extending radially from a hub, said hub being mounted for rotation on a front end of said head portion, a drive shaft interconnecting said hub with an input shaft of a gear box, and a rudder and fin assembly on a rear end of said head portion, said rudder comprising a vertical member, said fin assembly having a horizontal portion with a trailing edge, and elevator pivotally attached to said trailing edge;
   b. a turbine air compressor, said compressor having an upper air inlet and a lower air outlet, said air outlet being provided with a check valve, said turbine air compressor being driven by an output shaft of said gear box;
   c. a storage tank portion having an upper end and a lower end, said head portion being pivotally attached to said upper end of said storage tank portion, said storage tank portion having an inner volume containing said turbine air compressor, said air inlet of said turbine air compressor being in communication with a low pressure air supply line extending outside said inner volume, and said air outlet of said turbine air compressor being in communication with a high pressure air supply line extending outside said inner volume, said storage tank further including a cooling air inlet line and a cooling air outlet line in communication with said inner volume.

8. A wind turbine as in claim 7 in which said turbine air compressor produces a pressure differential between said low pressure air supply line and high pressure air supply line of approximately 300 psi.

9. A wind turbine as in claim 7 in which said inner volume includes at least one inner wall defining cooling air ducts effective to confine and direct cooling air around said low pressure air supply line and said high pressure air supply line.

10. A plurality of wind turbines, serially interconnected for staged compression to output high pressure compressed gas, comprising:
  a. a first wind turbine comprising: a head portion having at least two propellers extending radially from a hub, said hub being mounted for rotation on a front end of said head portion, a drive shaft interconnecting said hub with an input shaft of a gear box, and a rudder and fin assembly on a rear end of said head portion, said rudder comprising a vertical member, said fin assembly having a horizontal portion with a trailing edge, and elevator pivotally attached to said trailing edge; a gas turbine compressor, said compressor having an upper gas inlet and a lower gas outlet, said gas outlet being provided with a check valve, said gas turbine compressor being driven by an output shaft of said gear box; a storage tank portion having an upper end and a lower end, said head portion being pivotally attached to said upper end of said storage tank portion, said storage tank portion having an inner volume for the storage of compressed gas, said gas turbine compressor being mounted within said upper end of said storage tank portion with said upper gas inlet being in communication with gas outside said tank portion and said lower gas outlet being in communication with said inner volume; and, a first turbine gas supply line in communication with said inner volume, and extending outside said storage tank;
  b. a second wind turbine comprising: a head portion having at least two propellers extending radially from a hub, said hub being mounted for rotation on a front end of said head portion, a drive shaft interconnecting said hub with an input shaft of a gear box, and a rudder and fin assembly on a rear end of said head portion, said rudder comprising a vertical member, said fin assembly having a horizontal portion with a trailing edge, and elevator pivotally attached to said trailing edge; a gas turbine compressor, said compressor having an upper gas inlet and a lower gas outlet, said gas outlet being provided with a check valve, said gas turbine compressor being driven by an output shaft of said gear box; a storage tank portion having an upper end and a lower end, said head portion being pivotally attached to said upper end of said storage tank portion, said storage tank portion having an inner volume for the storage of compressed gas, said inner volume including an inner tank, said inner tank defining a first volume outside said inner tank and a second volume within said inner tank, and in which said gas turbine compressor is located within said first volume having its gas inlet in communication with said first volume, and in which said gas outlet of said gas turbine compressor is in communication with said second volume, said first wind turbine gas supply line being in communication with said first volume of said second wind turbine, whereby compressed gas produced by said first wind turbine is increased in pressure by said second wind turbine.

11. A plurality of wind turbines as in claim 10, in which compressed gas in said first wind turbine gas supply line is approximately 300 psi, and in which compressed gas in said second volume of said inner tank in said second wind turbine is approximately 600 psi.

12. A plurality of wind turbines as in claim 10, further including a third wind turbine, said third wind turbine comprising: a head portion having at least two propellers extending radially from a hub, said hub being mounted for rotation on a front end of said head portion, a drive shaft interconnecting said hub with an input shaft of a gear box, and a rudder and fin assembly on a rear end of said head portion, said rudder comprising a vertical member, said fin assembly having a horizontal portion with a trailing edge, and elevator pivotally attached to said trailing edge; a gas turbine compressor, said compressor having an upper gas inlet and a lower gas outlet, said gas outlet being provided with a check valve, said gas turbine compressor being driven by an output shaft of said gear box; a storage tank portion having an upper end and a lower end, said head portion being pivotally attached to said upper end of said storage tank portion, said storage tank portion having an inner volume containing said gas turbine compressor, said gas inlet of said gas turbine compressor being in communication with a second wind turbine gas supply line extending from said inner volume of said second wind turbine, and said gas outlet of said gas turbine compressor being in communication with a high pressure air supply line extending outside said inner volume, said storage tank further including a cooling air inlet line and a cooling air outlet line in communication with said inner volume.

13. A reserve tank for storing compressed air, comprising:
  a. a central tank, said central tank being in communication with a high pressure air supply line, said central tank being elongated and having sidewalls with a generally cylindrical configuration;
  b. a plurality of ring tanks, a first innermost one of said ring tanks being concentric with and surrounding said sidewall of said central tank and having a sidewall which is arranged and spaced from said sidewall of said central tank, said plurality further including successive rings tanks, each successively arranged around said first ring tank and around each other to form the reserve tank;
  c. a plurality of pressure-actuated transfer valves, a first of said transfer valves having an inlet side in communication with said central tank and an outlet side in communication with said first innermost ring tank, said first transfer valve being adapted to open and release air from said central tank into said first innermost ring tank, as long as a predetermined pressure differential exists between said central tank and said first innermost ring tank, said plurality of transfer valves further including successive transfer valves, each being successively arranged between adjacent successive ring tanks, having an inlet side in communication with an adjacent ring tank radially closer to said central tank and an outlet side in communication with an adjacent successive ring tank radially remote from said central tank.

14. A reserve tank as in claim 13, including nine ring tanks, in which the compressed air in said central tank is approximately 3000 psi, and in which the predetermined pressure differential between each tank is approximately 300 psi, so that an outermost ring tank stores compressed air at approximately 300 psi.

15. A reserve tank as in claim 14, in which compressed gas from said outermost ring tank drives one or more air turbines and respective electrical generators.

16. A wind turbine and compressed gas storage system for producing electrical energy, comprising:

a. a plurality of wind turbines, each of said wind turbines including an upper head portion with two or more propellers operatively connected through a drive shaft to an input of a gear box, a rudder and fin assembly, and a propeller feathering and braking means responsive to a movable portion of said fin assembly and effective to rotate said propellers out of engagement with the wind and to brake said drive shaft in response to strong wind, each of said wind turbines further including a lower storage tank portion having an upper end and a lower end, said upper head portion being pivotally mounted on said upper end of said lower storage tank portion, said storage tank portion housing a turbine compressor, each of said wind turbines having an air supply input and an air supply output, said wind turbines being serially interconnected for staged compression by connecting a respective air supply output of a first wind turbine to a respective air supply input of a second wind turbine and by connecting successive wind turbines in identical fashion to output high pressure compressed air from said line of wind turbines;

b. a reserve tank for receiving said high pressure compressed air, said reserve tank comprising a central tank surrounded by a plurality of concentric, scalloped, ring-like tanks, interconnected by pressure-actuated valves, each tank being adapted for storing compressed air at stepped pressures, varying from a highest pressure in said central tank to a lowest pressure in an outer tank ring; and, c. at least one air turbine having an inlet in communication with said outer tank ring, and an output drive shaft interconnected to an electrical generator.

17. A system as in claim 16 in which ten wind turbines are included in said plurality of wind turbines, and in which said high pressure compressed air is approximately 3000 psi, and in which said lowest pressure is approximately 300 psi.

18. A system as in claim 16 in which said plurality of tank rings comprises an innermost ring tank numbered nine and an outermost ring tank numbered one, and further including at least one by-pass line and a first regulator valve, said by-pass line having one end in communication with said central tank or one of the tank rings numbered nine through three, closest to said central tank, and said by-pass line having another end in communication with an inlet to said first regulator valve, said first regulator valve further having an outlet in communication with a ring tank numbered two, immediately inside said outermost ring tank numbered one, said regulator valve being effective to open when air pressure in said ring tank numbered two drops below 600 psi.

19. A system as in claim 18, further including a second regulator valve, said second regulator valve having an inlet in communication with said ring tank numbered two, and having an outlet in communication with said ring tank numbered one, said second regulator valve being effective to open when air pressure in said ring tank numbered one drops below 300 psi.

\* \* \* \* \*